(12) United States Patent
Aoki (10) Patent No.: US 9,238,190 B2
(45) Date of Patent: Jan. 19, 2016

(54) PLUGGED HONEYCOMB STRUCTURE

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 18 days.

(21) Appl. No.: 13/960,024

(22) Filed: Aug. 6, 2013

(65) Prior Publication Data

US 2014/0041350 A1 Feb. 13, 2014

(30) Foreign Application Priority Data

Aug. 13, 2012 (JP) ................................. 2012-179410

(51) Int. Cl.
*B01D 39/14* (2006.01)
*B01D 39/06* (2006.01)
*B01D 39/20* (2006.01)
*B01D 46/24* (2006.01)

(52) U.S. Cl.
CPC ............ *B01D 46/244* (2013.01); *B01D 46/247* (2013.01); *B01D 46/2459* (2013.01); *B01D 2046/2496* (2013.01); *F01N 2330/32* (2013.01)

(58) Field of Classification Search
CPC ... Y02T 10/20; F01N 3/0222; B01D 46/2429; B01D 46/2451; B01D 46/2418
See application file for complete search history.

(56) References Cited

U.S. PATENT DOCUMENTS

| 6,673,414 B2 * | 1/2004 | Ketcham et al. ............... 428/116 |
| 7,179,516 B2 * | 2/2007 | Ichikawa ...................... 428/116 |
| 7,244,284 B2 * | 7/2007 | Miwa et al. ................... 55/523 |
| 8,092,565 B2 * | 1/2012 | Yamada et al. ................. 55/483 |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0235622 A1 | 10/2005 | Cutler et al. |
| 2006/0093784 A1 | 5/2006 | Komori et al. |
| 2007/0227109 A1 | 10/2007 | Hong et al. |
| 2008/0086993 A1 | 4/2008 | Komori et al. |
| 2009/0004073 A1 | 1/2009 | Gleize et al. |
| 2009/0291836 A1 | 11/2009 | Ohno et al. |

(Continued)

FOREIGN PATENT DOCUMENTS

| EP | 2 505 247 A1 | 10/2012 |
| WO | 2004/024294 A1 | 3/2004 |

OTHER PUBLICATIONS

Extended European Search Report (Application No. 13179389.5) dated Jan. 3, 2014.

*Primary Examiner* — Amber Orlando
(74) *Attorney, Agent, or Firm* — Burr & Brown, PLLC (57) ABSTRACT

A plugged honeycomb structure includes a honeycomb structure section having porous partition walls, a plurality of cells including the cells having different open areas; inflow side plugged portions arranged in inflow side end portions of the predetermined cells; and outflow side plugged portions arranged in outflow side end portions of the remaining cells. Outflow cells which are the cells provided with the inflow side plugged portions and inflow cells which are the cells provided with the outflow side plugged portions are alternately formed, and in a central portion, the open area of each of the inflow cells is larger than the open area of each of the outflow cells. A difference in open area between the outflow cell and the inflow cell in an outer peripheral portion is smaller than a difference in open area between the outflow cell and the inflow cell in the central portion.

16 Claims, 5 Drawing Sheets

(56) References Cited

U.S. PATENT DOCUMENTS

| | | | |
|---|---|---|---|
| 2010/0062213 A1* | 3/2010 | Kondo | 428/118 |
| 2010/0247852 A1* | 9/2010 | Yamada et al. | 428/116 |
| 2010/0255250 A1 | 10/2010 | Komori et al. | |

* cited by examiner

PLUGGED HONEYCOMB STRUCTURE

The present application is an application based on JP-2012-179410 filed on Aug. 13, 2012 with the Japanese Patent Office, the entire contents of which are incorporated herein by reference.

BACKGROUND OF THE INVENTION

1. Field of the Invention

The present invention relates to a plugged honeycomb structure, and more particularly, it relates to a plugged honeycomb structure which can collect ash and particulate matter (PM) in large amounts and in which an increase of a pressure loss is suppressed.

2. Description of Related Art

In gases discharged from an internal combustion engine such as a diesel engine, various burning devices, and the like, a large amount of particulate matter (PM) mainly composed of soot is included. When this PM is discharged to the atmosphere as it is, an environmental pollution is caused. Therefore, in an exhaust system of the exhaust gas, a filter to collect the PM (e.g., a diesel particulate filter (DPF)) is disposed.

As the filter, there has been used a plugged honeycomb structure having porous partition walls with which a plurality of cells are formed to become through channels of fluids (an exhaust gas and a purified gas), and plugged portions to plug open frontal areas of the cells. The plugged portions are arranged in the open frontal areas of the predetermined cells (inflow cells) in an end surface on an outflow side of the fluid (the purified gas), and the open frontal areas of the remaining cells (outflow cells) in an end surface on an inflow side of the fluid (the exhaust gas).

In the above plugged honeycomb structure, when the exhaust gas is allowed to flow into the inflow cells, the PM in the exhaust gas is collected by the partition walls during passage of the exhaust gas through the partition walls, and "the purified gas from which the PM has been removed" flows out of the outflow cells.

Moreover, as the plugged honeycomb structure in recent years, there has been reported a plugged honeycomb structure constituted of two types of cells including large capacity cells having a relatively large area in a cross section perpendicular to a longitudinal direction, and small capacity cells having a relatively small area in the above cross section (see Patent Document 1). In this plugged honeycomb structure, the number of the large capacity cells is about the same as that of the small capacity cells. In this plugged honeycomb structure, a pressure loss during the collection of the ash, PM and the like is low, and the ash and PM can be collected in large amounts, as compared with a plugged honeycomb structure having one type of cell shape (e.g., an only quadrangular shape) in a cross section of the structure which is orthogonal to a cell extending direction. Hereinafter, "the plugged honeycomb structure having the one type of cell shape (e.g., the only quadrangular shape) in the cross section of the structure which is orthogonal to the cell extending direction" will be referred to as "a conventional plugged honeycomb structure" sometimes.
[Patent Document 1] WO 2004/024294

SUMMARY OF THE INVENTION

A plugged honeycomb structure disclosed in Patent Document 1 can collect ash and particulate matter (PM) in large amounts. However, in the above plugged honeycomb structure, a pressure loss is larger in a state where the PM is not deposited or the amount of PM is small, as compared with the above "conventional plugged honeycomb structure". Here, in recent years, a diesel engine itself has been improved, and hence the amount of PM discharged from the diesel engine has decreased. On the other hand, owing to exhaust gas regulation, a filter (the plugged honeycomb structure) is also required for an engine such as a GDI engine which discharges a less amount of PM. Consequently, there has earnestly been demanded development of the filter (the plugged honeycomb structure) in which an increase of a pressure loss is suppressed in a state where the PM is not deposited or an amount of deposited PM is small, and in which ash and PM can be deposited in large amounts.

The present invention has been developed in view of the problems of such conventional technologies, and an object thereof is to provide a plugged honeycomb structure which can collect ash and particulate matter (PM) in large amounts and in which an increase of a pressure loss is suppressed in a state where the ash and PM are not deposited or an amount of deposited ash and PM is small.

According to the present invention, the following plugged honeycomb structure is provided.

[1] A plugged honeycomb structure comprising: a honeycomb structure section having porous partition walls with which a plurality of cells extending from an inflow side end surface to an outflow side end surface are formed to become through channels of a fluid, the plurality of cells including cells having different open areas in a cross section perpendicular to an extending direction of the cells; inflow side plugged portions arranged in inflow side end portions of the predetermined cells; and outflow side plugged portions arranged in outflow side end portions of the remaining cells, wherein in the honeycomb structure section, outflow cells which are the cells provided with the inflow side plugged portions and inflow cells which are the cells provided with the outflow side plugged portions are alternately formed via the partition walls, the open area of each of the inflow cells in a central portion of the honeycomb structure section is larger than the open area of each of the outflow cells in the central portion of the honeycomb structure section, and a difference in the open area between the outflow cell and the inflow cell in an outer peripheral portion of the honeycomb structure section is smaller than a difference in the open area between the outflow cell and the inflow cell in the central portion of the honeycomb structure section.

[2] The plugged honeycomb structure according to the above [1], wherein in the honeycomb structure section, the difference in the open area between the outflow cell and the inflow cell decreases, from a center side toward an outer periphery of the honeycomb structure section in the outer peripheral portion of the honeycomb structure section.

[3] The plugged honeycomb structure according to the above [1], wherein the honeycomb structure section is constituted of outer peripheral honeycomb segments constituting an outer periphery of the honeycomb structure section, and central honeycomb segments positioned on inner sides of the outer peripheral honeycomb segments, in the central honeycomb segments, the open area of the inflow cell is larger than the open area of the outflow cell, and in the outer peripheral honeycomb segments, the open area of the outflow cell is the same as that of the inflow cell.

A plugged honeycomb structure of the present invention includes a honeycomb structure section provided with cells having different open areas in a cross section perpendicular to a cell extending direction. That is, the plugged honeycomb structure of the present invention includes the honeycomb structure section provided with outflow cells each having a small open area, and inflow cells each having an open area larger than the outflow cells, and hence the inflow cells can collect ash and particulate matter (PM) in large amounts. Moreover, in the plugged honeycomb structure of the present invention, "a difference in the open area between the outflow cell and the inflow cell in an outer peripheral portion of the honeycomb structure section is smaller than a difference in the open area between the outflow cell and the inflow cell in a central portion of the honeycomb structure section". Therefore, an increase of a pressure loss is suppressed in a state where the ash and PM are not deposited, or an amount of deposited ash and PM is small.

DETAILED DESCRIPTION OF THE INVENTION

Hereinafter, embodiments of the present invention will be described, but it should be understood that the present invention is not limited to the following embodiments and that the following embodiments to which modifications, improvements and the like are suitably added on the basis of ordinary knowledge of a person skilled in the art without departing from the gist of the present invention also fall in the gist of the present invention.

Figure 1:
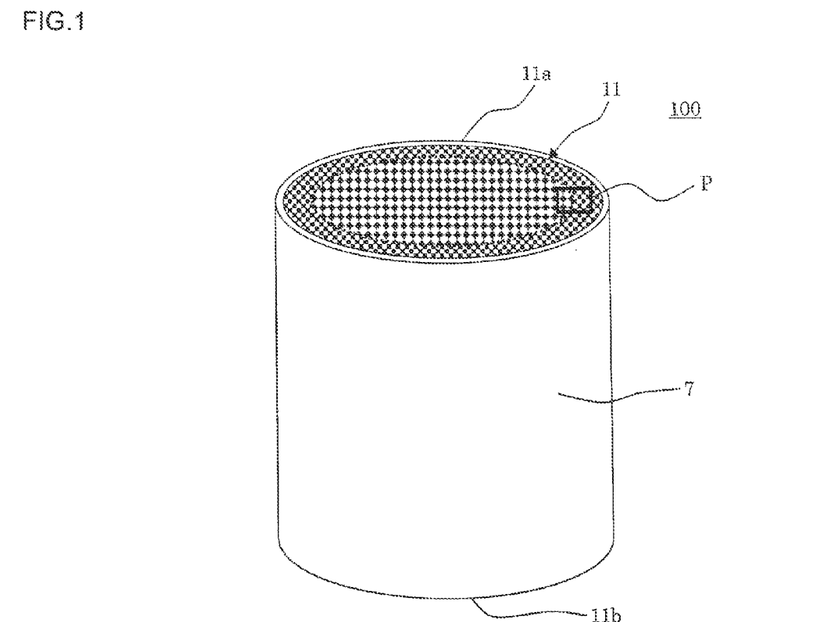
FIG. 1 is a perspective view schematically showing one embodiment of a plugged honeycomb structure of the present invention.
Figure 2:
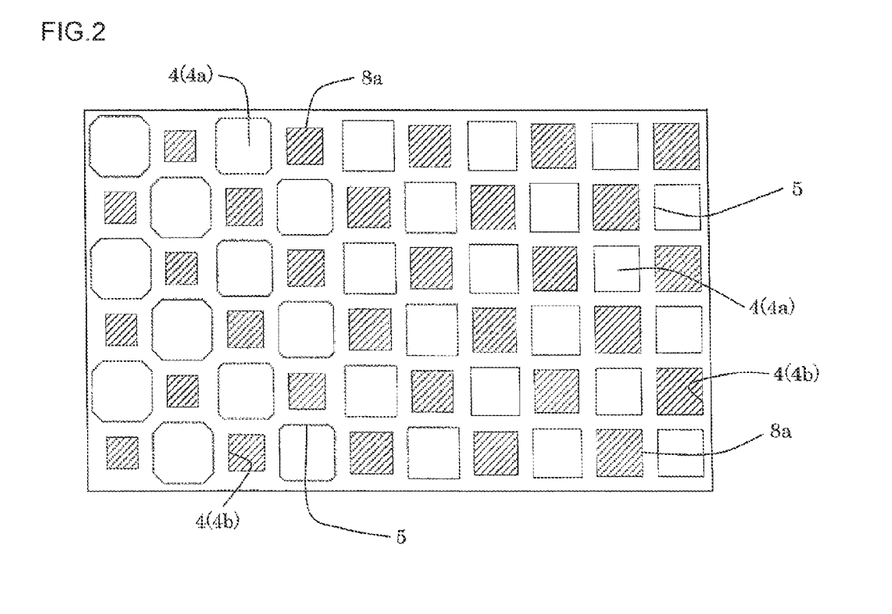
FIG. 2 is a plan view schematically showing an enlarged partial region P of one end surface of the plugged honeycomb structure shown in FIG. 1.

[1] Plugged Honeycomb Structure:

One embodiment of a plugged honeycomb structure of the present invention is, for example, a plugged honeycomb structure 100 shown in FIG. 1. The plugged honeycomb structure 100 includes a honeycomb structure section 11 having porous partition walls 5 with which a plurality of cells 4 (see FIG. 2) extending from an inflow side end surface 11a to an outflow side end surface 11b are formed to become through channels of a fluid. The plurality of cells 4 include cells having different open areas in a cross section perpendicular to an extending direction of the cells 4. Moreover, the plugged honeycomb structure 100 includes inflow side plugged portions 8a arranged in inflow side end portions of the predetermined cells, and outflow side plugged portions arranged in outflow side end portions of the remaining cells. In the honeycomb structure section 11, outflow cells 4b which are the cells provided with the inflow side plugged portions 8a and inflow cells 4a which are the cells provided with the outflow side plugged portions are alternately formed via the partition walls 5. Moreover, the open area of the inflow cell 4a in a central portion of the honeycomb structure section 11 is larger than the open area of the outflow cell 4b in the central portion of the honeycomb structure section 11. It is to be noted that the central portion of the honeycomb structure section 11 is the central portion in the cross section of the honeycomb structure section 11 which is perpendicular to the extending direction of the cells 4. Furthermore, a difference in open area between the outflow cell 4b and the inflow cell 4a in an outer peripheral portion of the honeycomb structure section 11 is smaller than a difference in open area between the outflow cell 4b and the inflow cell 4a in the central portion of the honeycomb structure section. It is to be noted that the outer peripheral portion of the honeycomb structure section 11 is the outer peripheral portion in the cross section of the honeycomb structure section 11 which is perpendicular to the extending direction of the cells 4. Furthermore, the plugged honeycomb structure 100 has an outer peripheral wall 7 disposed at an outer periphery of the honeycomb structure section 11. It is to be noted that the plugged honeycomb structure of the present invention does not necessarily have to have the outer peripheral wall 7. The outer peripheral wall 7 is preferably formed together with the partition walls 5 during extrusion forming of a formed honeycomb body in a process of preparing the honeycomb structure section 11. Moreover, the outer peripheral wall 7 may be formed by coating the outer periphery of the honeycomb structure section 11 with a ceramic material. FIG. 1 is a perspective view schematically showing the one embodiment of the plugged honeycomb structure of the present invention. FIG. 2 is a plan view schematically showing an enlarged partial region P of one end surface of the plugged honeycomb structure shown in FIG. 1.

The plugged honeycomb structure 100 includes the honeycomb structure section 11 provided with the cells having different open areas in the cross section perpendicular to the extending direction of the cells 4. That is, the plugged honeycomb structure 100 includes, in the central portion, the outflow cells 4b each having a small open area and the inflow cells 4a each having an open area larger than the outflow cells 4b. Therefore, in the plugged honeycomb structure 100, the inflow cells 4a can collect ash and particulate matter (PM) in large amounts. Moreover, in the plugged honeycomb structure 100, the difference in open area between the outflow cell 4b and the inflow cell 4a in the outer peripheral portion of the honeycomb structure section 11 is smaller than the difference in open area between the outflow cell 4b and the inflow cell 4a in the central portion of the honeycomb structure section 11. That is, in the plugged honeycomb structure 100, a pressure loss of the outer peripheral portion is smaller than that of the central portion. The plugged honeycomb structure 100 has a portion in which the pressure loss is small in this manner, and hence an increase of the pressure loss is suppressed. In particular, an increase of an initial pressure loss (i.e., the pressure loss in a stage where an amount of deposited PM is small) is effectively suppressed. In other words, the increase of the pressure loss is effectively suppressed in a state where the ash and PM are not deposited, or the amount of deposited ash and PM is small.

In the plugged honeycomb structure 100, the pressure loss of the outer peripheral portion is smaller than that of the central portion. Therefore, when the plugged honeycomb structure is mounted on a car or the like, the increase of the pressure loss is further suitably suppressed. Specifically, as to a usual exhaust pipe, a connecting portion of a purifying device containing the plugged honeycomb structure is conical, and a front edge of the exhaust pipe is disposed to face a central portion of the plugged honeycomb structure. Therefore, a large amount of PM included in an exhaust gas is deposited in the central portion of the plugged honeycomb structure, and the PM is not easily deposited in an outer peripheral portion of the plugged honeycomb structure. To solve the problem, the increase of the pressure loss in the outer peripheral portion which does not easily contribute to the collection of the PM is further suppressed. Consequently, the increase of the pressure loss of the whole plugged honeycomb structure can suitably be suppressed. That is, in the plugged honeycomb structure 100, the increase of the pressure loss can effectively be suppressed without deteriorating a collecting efficiency of the PM including soot and the like and the ash.

Here, "the outer peripheral portion of the honeycomb structure section" is the outer peripheral portion in the cross section perpendicular to the extending direction of the cells 4 as described above. More specifically, when the honeycomb structure section has a so-called integral structure, the outer peripheral portion is a portion in a region from the outer periphery of the cylindrical honeycomb structure section to a position of a length of 30% of a diameter of the honeycomb structure section. When the honeycomb structure section has a shape other than the cylindrical shape (e.g., a quadrangular pillar-like shape), the outer peripheral portion is a portion in a region from the outer periphery of the honeycomb structure section to a position of a length of 40% of "the longest diameter". A portion other than the outer peripheral portion corresponds to the central portion. When the honeycomb structure section is constituted of a plurality of honeycomb segments, the outer peripheral portion is preferably constituted of honeycomb segments (outer peripheral honeycomb segments) constituting the outer periphery of the honeycomb structure section irrespective of the above regulation.

It is to be noted that "the cell" in "the difference in open area between the outflow cell and the inflow cell" is a space formed by the partition walls (i.e., the space cut out by the partition walls), and does not include a space (a so-called incomplete cell) formed by the partition wall and the outer peripheral wall.

The open area of the cell in the cross section perpendicular to the cell extending direction is a value measured as follows. First, there are assumed a vertical line and a horizontal line passing through the center of the plugged honeycomb structure and crossing each other at right angles in a cross section of the plugged honeycomb structure which is orthogonal to the cell extending direction. Then, from "the cells which are not provided with the plugged portions" through which the vertical line passes, five or more cells are arbitrarily selected at an equal space. Moreover, from "the cells which are not provided with the plugged portions" through which the horizontal line passes, five or more cells are arbitrarily selected at an equal space. Afterward, an open width of each of the arbitrarily selected cells is measured. "The open width of the cell" is a length between the partition walls facing each other. It is to be noted that when the honeycomb structure section is constituted of the plurality of honeycomb segments, a vertical line and a horizontal line of each of the honeycomb segments are assumed by a method similar to that of the above "plugged honeycomb structure", and the cells are arbitrarily selected. Afterward, an open width of each of the arbitrarily selected cells is measured. Next, the open area is calculated from an average value of the measured open widths. In consequence, the open areas of the large cell and the small cell are determined.

In the honeycomb structure section 11, as shown in FIG. 2, the difference in open area between the outflow cell 4b and the inflow cell 4a decreases, from a center side toward the outer periphery of the honeycomb structure section in the outer peripheral portion of the honeycomb structure section 11. According to such a constitution, a hydraulic diameter of the outflow cell of the outer peripheral portion increases, thereby advantageously decreasing the initial pressure loss.

"The difference in open area between the outflow cell and the inflow cell decreases, from the center side toward the outer periphery of the honeycomb structure section in the outer peripheral portion of the honeycomb structure section" as follows. In other words, the open areas of the adjacent inflow cells in the outer peripheral portion of the honeycomb structure section decrease closer to the outer periphery, and the open areas of the adjacent outflow cells in the outer peripheral portion of the honeycomb structure section increase closer to the outer periphery. However, the open area of the inflow cell is not smaller than the open area of the outflow cell, and the open area of the outflow cell is not larger than the open area of the inflow cell.

It is to be noted that the honeycomb structure section 11 can be constituted of the plurality of honeycomb segments. Specifically, the honeycomb structure section 11 is preferably constituted of outer peripheral honeycomb segments 21 constituting the outer periphery of the honeycomb structure section 11, and central honeycomb segments 22 positioned on inner sides of the outer peripheral honeycomb segments 21. When the honeycomb structure section 11 is constituted of the plurality of outer peripheral honeycomb segments 21 constituting the outer periphery of the honeycomb structure section 11 and the central honeycomb segments 22 positioned on the inner sides of the outer peripheral honeycomb segments 21, the following constitution is preferable. That is, in the central honeycomb segments 22, the open area of the inflow cell 4a is larger than the open area of the outflow cell 4b, and in the outer peripheral honeycomb segments 21, the open area of the outflow cell 4b is preferably the same as that of the inflow cell 4a. The honeycomb structure section 11 can easily be prepared by combining honeycomb segments each having a heretofore known structure.

[1-1] Honeycomb Structure Section:

In the plugged honeycomb structure 100, there is not any special restriction on a shape of the honeycomb structure section 11, but examples of the shape preferably include a cylindrical shape, a tubular shape with elliptic end surfaces, and prismatic pillar-like shapes with end surfaces having polygonal shapes such as "a regular square shape, a rectangular shape, a triangular shape, a pentangular shape, a hexagonal shape and an octagonal shape". The honeycomb structure section 11 shown in FIG. 1 is an example of the cylindrical shape.

Figure 3:
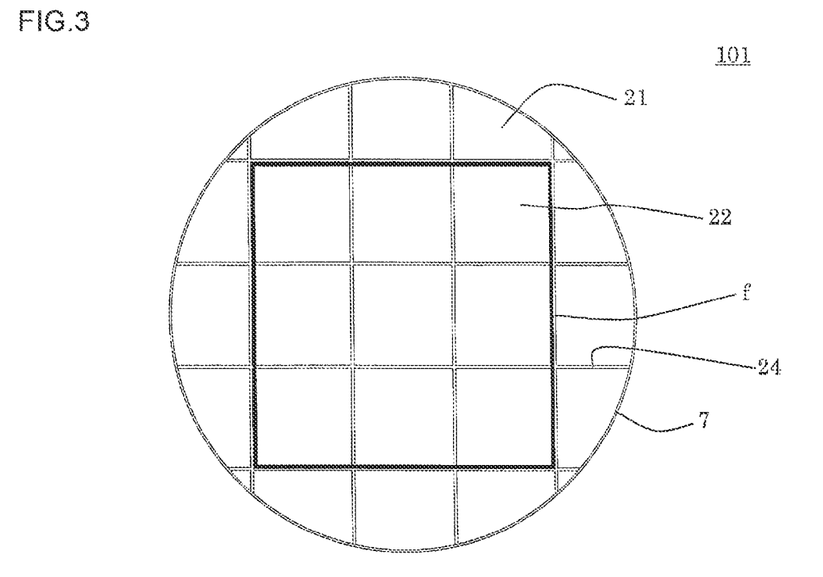
FIG. 3 is a plan view schematically showing one end surface of another embodiment of the plugged honeycomb structure of the present invention.
Figure 4:
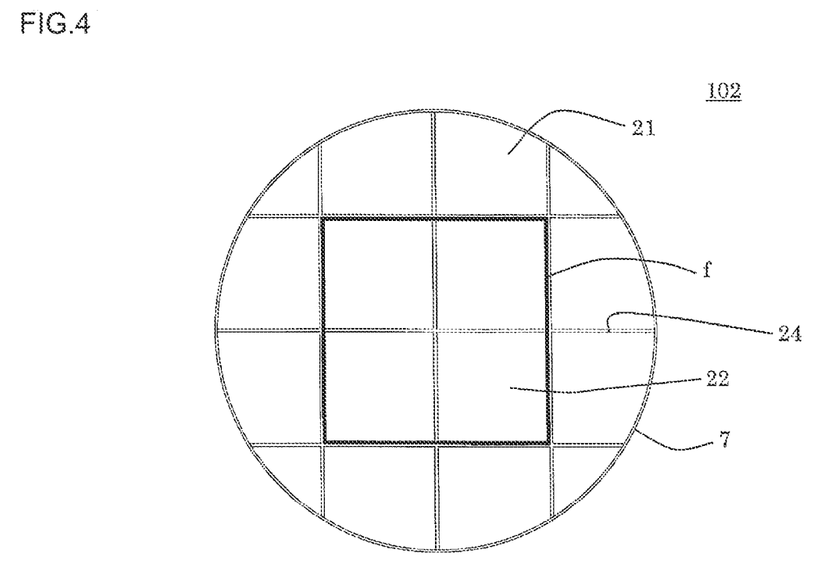
FIG. 4 is a plan view schematically showing one end surface of still another embodiment of the plugged honeycomb structure of the present invention.
Figure 5:
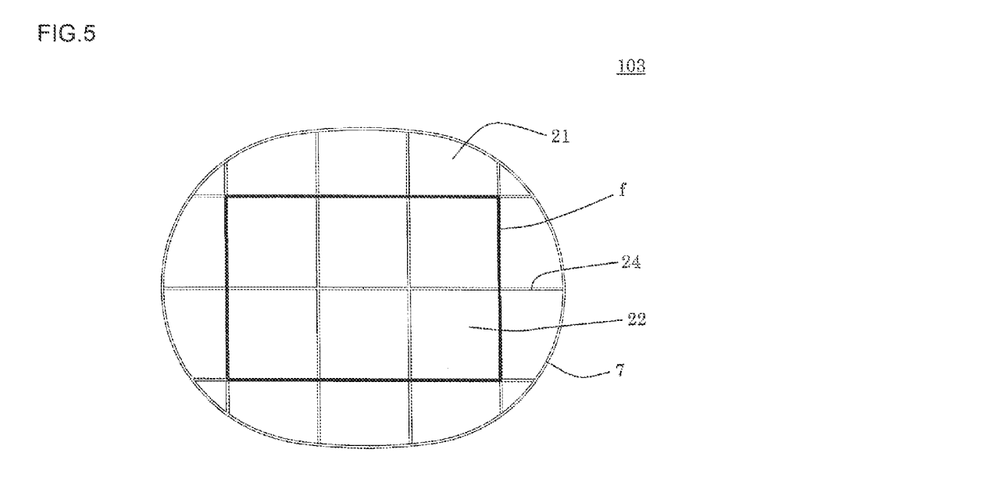
FIG. 5 is a plan view schematically showing one end surface of a further embodiment of the plugged honeycomb structure of the present invention.

The honeycomb structure section 11 may include the plurality of honeycomb segments 21 or 22 each having porous partition walls with which a plurality of cells extending from an inflow side end surface to an outflow side end surface are formed to become through channels of a fluid, as in plugged honeycomb structures 101 to 103 shown in FIG. 3 to FIG. 5. The plurality of honeycomb segments 21 or 22 are joined by a joining material 24 in a state where the honeycomb segments are arranged adjacent to each other so that side surfaces of the honeycomb segments face each other. Among the plurality of honeycomb segments, in the outer peripheral honeycomb segments 21, all the cells have a quadrangular shape in the cross section orthogonal to the cell extending direction. In the outer peripheral honeycomb segments 21, the inflow cells and the outflow cells are alternately formed via the partition walls. In the central honeycomb segments 22, the inflow cells having an octagonal shape in the cross section orthogonal to the cell extending direction and the outflow cells having a quadrangular shape in the cross section orthogonal to the cell extending direction are alternately formed via the partition walls.

The plugged honeycomb structure 101 shown in FIG. 3 is constituted of 16 outer peripheral honeycomb segments 21 constituting an outer periphery of a cylindrical honeycomb structure section 11 and nine central honeycomb segments 22 positioned on inner sides of the outer peripheral honeycomb segments 21. It is to be noted that the central honeycomb segments 22 are the nine honeycomb segments surrounded with a bold line f. FIG. 3 is a plan view schematically showing one end surface of another embodiment of the plugged honeycomb structure of the present invention.

The plugged honeycomb structure 102 shown in FIG. 4 is constituted of 12 outer peripheral honeycomb segments 21 constituting an outer periphery of a cylindrical honeycomb structure section 11 and four central honeycomb segments 22 positioned on inner sides of the outer peripheral honeycomb segments 21. It is to be noted that the central honeycomb segments 22 are the four honeycomb segments surrounded with a bold line f. FIG. 4 is a plan view schematically showing one end surface of still another embodiment of the plugged honeycomb structure of the present invention.

The plugged honeycomb structure 103 shown in FIG. 5 is constituted of 14 outer peripheral honeycomb segments 21 constituting an outer periphery of an elliptic tubular honeycomb structure section 11 and six central honeycomb segments 22 positioned on inner sides of the outer peripheral honeycomb segments 21. It is to be noted that the central honeycomb segments 22 are the six honeycomb segments surrounded with a bold line f. FIG. 5 is a plan view schematically showing one end surface of a further embodiment of the plugged honeycomb structure of the present invention.

In the plugged honeycomb structure of the present invention, the inflow cells and the outflow cells are alternately formed via the partition walls. According to such a constitution, the fluid (the exhaust gas) which has flowed into the inflow cells passes through the partition walls to flow into the outflow cells, and is discharged from open frontal areas of the outflow cells in the outflow side end surface. Moreover, when the fluid moves from the inflow cells to the outflow cells, PM such as the soot in the fluid is collected by the porous partition walls.

In the plugged honeycomb structure of the present invention, the open area of the inflow cell formed in the central portion of the honeycomb structure section is larger than the open area of the outflow cell formed in the central portion of the honeycomb structure section. Specifically, the open area of the inflow cell is preferably from 1.2 to 5.5 times, further preferably from 1.3 to 4.7 times, and especially preferably from 1.4 to 4.3 times the open area of the outflow cell. When a ratio of the open area of the inflow cell to the open area of the outflow cell is in the above range, a volume of the inflow cell moderately increases. Therefore, a collecting capacity of the ash and PM increases. When the ratio is smaller than the above lower limit value, the volume of the inflow cell does not sufficiently increase. Therefore, the collecting capacity of the ash and PM might not sufficiently be increased. When the ratio is in excess of the above upper limit value, the hydraulic diameter of the outflow cell excessively decreases, which might cause a defect that the initial pressure loss noticeably increases. It is to be noted that the above open area is an open area in the cross section perpendicular to the cell extending direction.

Shapes of the inflow cell and the outflow cell formed in the central portion of the honeycomb structure section may be any shapes, when the open area of the above inflow cell is larger than the open area of the above outflow cell. Examples of the shapes of the inflow cell and the outflow cell include polygonal shapes such as a triangular shape, a quadrangular shape, a hexagonal shape and an octagonal shape. In particular, it is preferable that the inflow cell shape is the octagonal shape and that the outflow cell shape is the quadrangular shape. In this case, a length of each of "four sides" of the inflow cell "which are adjacent to the outflow cells via the partition walls" is further preferably the same as a width of the outflow cell. According to such a constitution, a mechanical strength of the plugged honeycomb structure can be enhanced.

A thickness of each of the partition walls 5 constituting the honeycomb structure section 11 in the cross section perpendicular to the extending direction of the cells 4 (hereinafter referred to simply as "the thickness of the partition wall 5" sometimes) is basically uniform. "Basically uniform" means that the thicknesses of the partition walls are uniform except for a case where a small difference in thickness between the partition walls is made, for example, due to deformation at formation. That is, in the plugged honeycomb structure of the present invention, any differences in thickness between the partition walls are not intentionally made, and the thicknesses of the partition walls are uniform in the above cross section. For example, when a slit of a die (a mold) for extrusion-forming of the honeycomb structure section is manufactured by slicer processing, the above partition walls having the uniform thickness are realized.

The thickness of the partition wall 5 is preferably from 64 to 508 μm, further preferably from 89 to 381 μm, and especially preferably from 110 to 305 μm. When the thickness of the partition wall 5 is in the above range, a strength of the plugged honeycomb structure 100 can be maintained, and the increase of the initial pressure loss can further be suppressed. When the thickness is smaller than 64 μm, the strength of the plugged honeycomb structure 100 deteriorates sometimes. When the thickness is larger than 508 μm, the initial pressure loss of the plugged honeycomb structure 100 increases sometimes. The above thickness of the partition wall 5 is the thickness of the partition wall in a portion which separates the inflow cell and the outflow cell from each other.

A porosity of the partition wall 5 is preferably from 35 to 70%, further preferably from 40 to 70%, and especially preferably from 40 to 65%. When the porosity of the partition wall 5 is in the above range, the strength of the plugged honeycomb structure 100 can be maintained, and the increase of the initial pressure loss can further be suppressed. When the porosity is smaller than 35%, the initial pressure loss of the plugged honeycomb structure 100 increases sometimes. When the porosity is larger than 70%, the strength of the plugged honeycomb structure 100 deteriorates sometimes. The porosity is a value measured by a mercury porosimeter.

An average pore diameter of the partition walls 5 is preferably from 7 to 30 μm, further preferably from 8 to 27 μm, and especially preferably from 9 to 25 μm. When the average pore diameter of the partition walls 5 is in the above range, the strength of the plugged honeycomb structure 100 can be maintained, and the increase of the initial pressure loss can further be suppressed. When the average pore diameter is smaller than 7 μm, the initial pressure loss of the plugged honeycomb structure 100 increases sometimes. When the average pore diameter is larger than 30 μm, a collecting performance of the ash and PM deteriorates sometimes. The average pore diameter is a value measured by the mercury porosimeter.

There is not any special restriction on a cell density of the honeycomb structure section 11, but the cell density is preferably from 15 to 62 cells/cm$^2$, and further preferably from 31 to 56 cells/cm$^2$. When the cell density is in the above range, the pressure loss can be minimized while maintaining the strength of the honeycomb structure section. When the cell density is smaller than 15 cells/cm$^2$, the strength of the honeycomb structure section deteriorates. Therefore, the honeycomb structure section might break down at canning. When the cell density is larger than 62 cells/cm$^2$, the initial pressure loss excessively increases. Therefore, an engine output might decrease, and a fuel efficiency might deteriorate.

A material of the partition walls 5 is preferably a ceramic material. Because of excellent strength and heat resisting properties, the material is further preferably at least one selected from the group consisting of cordierite, silicon carbide, a silicon-silicon carbide composite material, mullite, alumina, aluminum titanate, silicon nitride, and a silicon carbide-cordierite composite material. Among these materials, cordierite is especially preferable.

An example of a material of the plugged portions (the inflow side plugged portions 8a and the outflow side plugged portions) is the same material as the material of the partition walls 5, and the same material as that of the partition walls 5 is preferably used.

A length L of the plugged honeycomb structure 100 in the cell extending direction is preferably from 50 to 381 mm, further preferably from 70 to 330 mm, and especially preferably from 100 to 305 mm. In the above range, the collecting capacity in accordance with an amount of the PM discharged from various engines can be secured in a limited space.

A diameter D of the cross section of the plugged honeycomb structure 100 which is orthogonal to the cell extending direction is preferably from 50 to 381 mm, further preferably from 70 to 330 mm, and especially preferably from 100 to 305 mm. When the diameter D is in the above range, the collecting capacity in accordance with the amount of the PM discharged from various engines can be secured in the limited space.

A value of the length L/the diameter D of the plugged honeycomb structure 100 is preferably from 0.5 to 2, further preferably from 0.6 to 1.7, and especially preferably from 0.7 to 1.6. In the above range, ring cracks can be suppressed.

[2] Manufacturing Method of Plugged Honeycomb Structure:

A manufacturing method of the plugged honeycomb structure of the present invention will be described. First, a kneaded material for preparation of the honeycomb structure section is prepared, and this kneaded material is formed to prepare a formed honeycomb body (a forming step). In the formed honeycomb body to be prepared, two types of cells (the inflow cell and the outflow cell) having different open areas in the cross section perpendicular to the cell extending direction are alternately formed via the partition wall. Moreover, the above open area of the inflow cell in a central portion of a formed honeycomb section is larger than the above open area of the outflow cell in the central portion of the formed honeycomb section. Furthermore, a difference in open area between the cell which becomes the outflow cell and the cell which becomes the inflow cell in an outer peripheral portion of the formed honeycomb body to be prepared is smaller than a difference in open area between the cell which becomes the outflow cell and the cell which becomes the inflow cell in the central portion of the honeycomb structure section. A shape, a size (a sectional area) and the like of each cell can suitably be determined in conformity to the preferable cell example described above in the plugged honeycomb structure of the present embodiment.

Next, the obtained formed honeycomb body (or a dried honeycomb body subjected to drying performed as required) is fired to prepare the honeycomb structure section (a honeycomb structure section preparing step).

Next, one end portion (an inflow side end portion) of each of the predetermined cells of the formed honeycomb body is provided with the inflow side plugged portion, and the other end portion (an outflow side end portion) of each of the remaining cells is provided with the outflow side plugged portion (a plugging step). At this time, the outflow cells which are the cells provided with the inflow side plugged portions and the inflow cells which are the cells provided with the outflow side plugged portions are alternately formed via the partition walls. As described above, the plugged honeycomb structure of the present invention can be manufactured. Hereinafter, each manufacturing step will further specifically be described.

[2-1] Forming Step:

First, in the forming step, a ceramic forming raw material containing a ceramic raw material is formed, to obtain the formed honeycomb body in which the plurality of cells are formed to become the through channels of the fluid.

Examples of the ceramic raw material contained in the ceramic forming raw material include silicon carbide (SiC), a silicon-silicon carbide composite material formed by using silicon carbide (SiC) as an aggregate and silicon (Si) as a binding agent, silicon nitride, a cordierite forming raw material, cordierite, mullite, alumina, titania, silicon carbide, and aluminum titanate. Moreover, the material is preferably at least one selected from the group consisting of silicon carbide (SiC), the silicon-silicon carbide composite material, the cordierite forming raw material, cordierite, mullite, alumina, titania, silicon carbide, and aluminum titanate. It is to be noted that "the cordierite forming raw material" is a ceramic raw material blended so as to obtain a chemical composition which falls in ranges of 42 to 56 mass % of silica, 30 to 45 mass % of alumina, and 12 to 16 mass % of magnesia, and the material is fired to become cordierite.

Moreover, this ceramic forming raw material is preferably prepared by mixing the above ceramic raw material with a dispersion medium, an organic binder, an inorganic binder, a pore former, a surfactant and the like. There is not any special restriction on a composition ratio of each raw material, and the composition ratio is preferably determined in accordance with a structure, a material and the like of the honeycomb structure section to be prepared.

In the formation of the ceramic forming raw material, it is preferable that the forming raw material is first kneaded to obtain the kneaded material and that the obtained kneaded material is formed into a honeycomb shape. There is not any special restriction on a method of kneading the forming raw material to form the kneaded material, and an example of the method is a method using a kneader, a vacuum clay kneader or the like. There is not any special restriction on a method of forming the kneaded material to obtain the formed honeycomb body, and a heretofore known forming method such as extrusion forming or injection forming can be used. An example of the method is preferably a method of performing the extrusion forming by use of a die having a desirable cell shape, partition wall thickness and cell density to obtain the formed honeycomb body. A material of the die is preferably a super hard alloy which does not easily wear out.

There is not any special restriction on a shape of the formed honeycomb body, and examples of the shape include a cylindrical shape (a columnar shape), and a tubular shape (a pillar-like shape) in which a cross section orthogonal to a central axis has an elliptic shape, a race track shape, or a polygonal shape such as a triangular shape, a quadrangular shape, a pentangular shape, a hexagonal shape or an octagonal shape.

When the honeycomb structure section to be prepared is prepared by joining a plurality of honeycomb segments, the shape of the formed honeycomb body is preferably a tubular shape (a pillar-like shape) in which a cross section orthogonal to a central axis has a polygonal shape such as a triangular shape, a quadrangular shape, a pentangular shape, a hexagonal shape or an octagonal shape. This is because one honeycomb structure section is easily prepared by combining these segments.

Moreover, after the above formation, the obtained formed honeycomb body may be dried. There is not any special restriction on a drying method, but examples of the method include hot air drying, microwave drying, dielectric drying, reduced pressure drying, vacuum drying, and freeze drying. Among these methods, the dielectric drying, the microwave drying or the hot air drying is preferably performed alone or a combination of the methods is preferably performed.

[2-2] Honeycomb Structure Section Preparing Step:

Next, the obtained formed honeycomb body is fired to prepare the honeycomb structure section. It is to be noted that the firing of the formed honeycomb body may be performed after arranging the plugged portions in the formed honeycomb body.

Moreover, the formed honeycomb body is preferably calcinated prior to the firing (main firing) of the formed honeycomb body. The calcinating is performed for the purpose of degreasing, and there is not any special restriction on a calcinating method. The method may be any method capable of removing an organic substance (the organic binder, the dispersant, the pore former, etc.) in the formed honeycomb body. In general, a burning temperature of the organic binder is from about 100 to 300° C., and a burning temperature of the pore former is from about 200 to 800° C. Therefore, as calcinating conditions, it is preferable that heating is performed at about 200 to 1000° C. in an oxidation atmosphere for about three to 100 hours.

The firing (the main firing) of the formed honeycomb body is performed for the purpose of sintering and densifying the forming raw material constituting the calcinated formed body to secure a predetermined strength. Firing conditions (temperature, time and atmosphere) vary in accordance with the type of the forming raw material, and hence suitable conditions may be selected in accordance with the type. For example, when the cordierite forming raw material is used, the firing temperature is preferably from 1410 to 1440° C. Moreover, the firing time, as time to keep the highest temperature, is preferably from four to six hours.

It is to be noted that when the honeycomb structure section is constituted of a plurality of honeycomb segments, a plurality of formed honeycomb bodies or fired formed honeycomb bodies are joined by the joining material in a state where the bodies are arranged adjacent to each other so that side surfaces of the bodies face each other. As the joining material, a heretofore known joining material can be used.

[2-3] Plugging Step:

Next, in the honeycomb structure section, the inflow side end portions of the predetermined cells and the outflow side end portions of the remaining cells are charged with a plugging material, to form the inflow side plugged portions and the outflow side plugged portions, respectively.

When the honeycomb structure section is charged with the plugging material, one end portion (inflow side end portion) side is first charged with the plugging material, and then the other end portion (outflow side end portion) side is charged with the plugging material. An example of a method of charging the one end portion side with the plugging material is a method having the following masking step and press-in step.

The masking step is a step of attaching a sheet to one end surface (e.g., the inflow side end surface) of the honeycomb structure section and making holes at positions which overlap with "the cells to be provided with the plugged portions" in the sheet. The press-in step is a step of pressing "the end portion of the honeycomb structure section to which the sheet has been attached" into a container containing the plugging material, to press the plugging material into the cells of the honeycomb structure section. When the plugging material is pressed into the cells of the honeycomb structure section, the plugging material passes through the holes made in the sheet so that the only cells communicating with the holes made in the sheet are charged.

Next, the plugging material with which the honeycomb structure section has been charged is dried to form the plugged portions, thereby obtaining the plugged honeycomb structure. It is to be noted that after charging both the end portions of the honeycomb structure section with the plugging material, the plugging material may be dried. Moreover, after drying the plugging material with which the one end portion of the honeycomb structure section has been charged, the other end portion may be charged with the plugging material, and then the plugging material with which the other end portion has been charged may be dried. Furthermore, the plugging material may be fired for the purpose of more securely fixing the material. Additionally, the formed honeycomb body before or after the drying may be charged with the plugging material, and the plugging material may be fired together with the formed honeycomb body before or after the drying.

It is to be noted that when the honeycomb structure section is formed by joining the plurality of honeycomb segments, the honeycomb structure section can be prepared as follows. That is, first, a plurality of "honeycomb segments (outer peripheral honeycomb segments) provided with a plurality of cells having the same open area (e.g., quadrangular cells having the same open area) in the cross section perpendicular to the cell extending direction are prepared. Then, a plurality of honeycomb segments (central honeycomb segments) in which inflow cells (e.g., octagonal cells) and outflow cells (e.g., quadrangular cells) are alternately formed via partition walls are prepared. Afterward, the plurality of central honeycomb segments are joined by side surfaces facing each other, the outer peripheral honeycomb segments are arranged on outer sides of the central honeycomb segments, and then the outer peripheral honeycomb segments and the central honeycomb segments are joined. In this way, such plugged honeycomb structures as shown in FIG. 3 to FIG. 5 can be prepared.

As described above, the plugged honeycomb structure of the present invention can be manufactured. However, the manufacturing method of the plugged honeycomb structure of the present invention is not limited to the above-mentioned manufacturing method.

EXAMPLES

Hereinafter, examples of the present invention will specifically be described, but the present invention is not limited to these examples.

Example 1

As a ceramic raw material, a cordierite forming raw material (alumina, talc and kaolin) was used. A mass ratio of alumina, talc and kaolin was a mass ratio at which cordierite was obtained after firing. The ceramic raw material was mixed with a binder (methylcellulose) and water, to obtain a ceramic forming raw material. The obtained ceramic forming raw material was kneaded by using a kneader to obtain a kneaded material. The kneaded material was subjected to extrusion forming to obtain a formed honeycomb bodies.

In these formed honeycomb bodies, cells to become outflow cells and cells to become inflow cells were alternately formed via partition walls. Furthermore, in each of these formed honeycomb bodies, a difference in open area between the cell to become the outflow cell and the cell to become the inflow cell decreased, from a center side toward an outer periphery of the formed honeycomb body in an outer peripheral portion of the formed honeycomb body (see FIG. 2).

Next, end surfaces (an inflow side end surface and an outflow side end surface) of the formed honeycomb body were masked. At this time, masked cells and cells which were not masked were alternately arranged (so-called checkered patterns were formed in both the end surfaces). Then, an end portion of the body on a masked side was immersed into a plugging slurry, to charge, with the plugging slurry, open frontal areas of the cells which were not masked. In this way, plugged formed honeycomb bodies were obtained in which the open frontal areas of the inflow side end portions of the predetermined cells and the open frontal areas of the outflow side end portions of the remaining cells were charged with the plugging slurry. As the plugging slurry, a slurry containing a material similar that of the formed honeycomb body was used.

Next, the obtained plugged formed honeycomb bodies were heated at 450° C. for five hours to perform degreasing, and further heated at 1425° C. for seven hours to perform firing, thereby obtaining a plugged honeycomb structure.

In a central portion of a honeycomb structure section of the plugged honeycomb structure, a partition wall thickness was 0.15 mm. Moreover, in the central portion of the honeycomb structure section of the plugged honeycomb structure, an inflow cell open area was 1.744 mm$^2$, and an outflow cell open area was 0.720 mm$^2$. In the central portion of the honeycomb structure section of the plugged honeycomb structure, a cell density was 34 cells/cm$^2$.

In an outer peripheral portion of the honeycomb structure section of the plugged honeycomb structure, a partition wall thickness was 0.15 mm. Moreover, in the outer peripheral portion of the honeycomb structure section of the plugged honeycomb structure, an inflow cell open area was from 1.217 mm$^2$ (an outer peripheral side of the honeycomb structure section) to 1.582 mm$^2$ (the center side of the honeycomb structure section). Furthermore, an outflow cell open area was from 0.871 mm$^2$ (the center side of the honeycomb structure section) to 1.217 mm$^2$ (the outer peripheral side of the honeycomb structure section). Additionally, the above inflow cell open area decreased, from the center side toward the outer periphery of the honeycomb structure section. Moreover, the above outflow cell open area increased, from the center side toward the outer periphery of the honeycomb structure section. In the outer peripheral portion of the honeycomb structure section of the plugged honeycomb structure, a cell density was 34 cells/cm$^2$. In the honeycomb structure section of the plugged honeycomb structure of the present example, a difference in open area between the outflow cell and the inflow cell decreased, from the center side toward the outer periphery of the honeycomb structure section in the outer peripheral portion of the honeycomb structure section.

In the plugged honeycomb structure, a length in a cell extending direction was 152.4 mm, and a diameter was 143.8 mm. In the plugged honeycomb segments, a partition wall porosity was 48%. An average pore diameter of the partition walls was 12 μm. The measurement results are shown in Table 1.

TABLE 1

| | Length (mm) | Dia. (mm) | Integral structure/segment structure | Partition wall thickness (mm) | Porosity (%) | Average pore dia. (μm) | Cell density (cells/cm$^2$) | Inflow cell open area in central portion (mm$^2$) | Outflow cell open area in central portion (mm$^2$) | Inflow cell open area in outer peripheral portion (mm$^2$) | Outflow cell open area in outer peripheral portion (mm$^2$) |
|---|---|---|---|---|---|---|---|---|---|---|---|
| Example 1 | 152.4 | 143.8 | Integral structure | 0.15 | 48 | 12 | 34 | 1.744 | 0.720 | 1.217 to 1.582 | 0.871 to 1.217 |
| Comparative Example 1 | 152.4 | 143.8 | Integral structure | 0.15 | 48 | 12 | 34 | 1.744 | 0.720 | 1.74 | 0.72 |
| Comparative Example 2 | 152.4 | 143.8 | Integral structure | 0.15 | 48 | 12 | 34 | 1.217 | 1.217 | 1.22 | 1.22 |
| Example 2 | 152.4 | 143.8 | Integral structure | 0.30 | 48 | 12 | 47 | 0.880 | 0.492 | 0.675 to 0.820 | 0.543 to 0.675 |
| Comparative Example 3 | 152.4 | 143.8 | Integral structure | 0.30 | 48 | 12 | 47 | 0.880 | 0.492 | 0.88 | 0.49 |
| Comparative Example 4 | 152.4 | 143.8 | Integral structure | 0.30 | 48 | 12 | 47 | 0.675 | 0.675 | 0.68 | 0.68 |

[Measurement of Pressure Loss (kPa)]:

Pressure losses were measured by changing a type of a gas to be supplied to the plugged honeycomb structure. Specifically, the pressure loss at the supply of a gas (air) which did not include soot and the pressure loss at the supply of an exhaust gas including the soot were measured.

In the measurement of the pressure losses, first, the prepared plugged honeycomb structure was contained in a containing can to obtain an exhaust gas purifying system. Next, the gas (the air) at 25° C. which did not include the soot was supplied to this exhaust gas purifying system at a predetermined flow rate. The pressure loss in this case was measured. The measurement results are shown in Table 2 and FIG. 6.

The measured pressure losses were evaluated by use of the following references. Specifically, the pressure loss of each of Comparative Examples 1 and 3 when the flow rate of the exhaust gas was "10 Nm$^3$/minute" was a reference (100%). In this case, when the pressure loss decreased as much as 10% or more of the pressure loss of Comparative Example 1 or 3, the pressure loss was "suitable" ("A" is shown in Table 2). When the ratio of the decrease of the pressure loss to the pressure loss of Comparative Example 1 or 3 was 5% or more and less than 10%, the pressure loss was "passable" ("B" is shown in Table 2). When the ratio of the decrease of the pressure loss to the pressure loss of Comparative Example 1 or 3 was less than 5%, the pressure loss was "improper" ("C" is shown in Table 2). It is to be noted that Example 1 uses Comparative Example 1 as the reference, and Example 2 uses Comparative Example 3 as the reference. The results are shown in Table 2.

Next, the exhaust gas at 200° C. (the exhaust gas including the soot) was passed through the above exhaust gas purifying system at a flow rate of 1.5 Nm³/minute by use of a soot generator. The pressure loss in this case was measured. The measurement results are shown in Table 3, FIG. 7 and FIG. 8.

The measured pressure losses were evaluated by use of the following references. Specifically, as to the pressure loss when an amount of deposited soot was 0.20 g/L, the pressure loss of each of Comparative Examples 1 and 3 was a reference (100%). In this case, when an increase ratio of the pressure loss on the basis of the pressure loss of Comparative Example 1 or 3 was 5% or less, the pressure loss was "suitable" ("A" is shown in Table 3). When the increase ratio of the pressure loss on the basis of the pressure loss of Comparative Example 1 or 3 was in excess of 5% and 10% or less, the pressure loss was "passable" ("B" is shown in Table 3). When the increase ratio of the pressure loss on the basis of the pressure loss of Comparative Example 1 or 3 was in excess of 10%, the pressure loss was "improper" ("C" is shown in Table 3). It is to be noted that Example 1 uses Comparative Example 1 as the reference, and Example 2 uses Comparative Example 3 as the reference. The results are shown in Table 3.

[Initial Pressure Loss to Amount of Deposited Ash]:

An initial pressure loss to an amount of collected ash was measured by use of a plugged honeycomb structure A in which octagonal cells (inflow cells) and quadrangular cells (outflow cells) were alternately formed via partition walls (large cells and small cells were alternately formed) in a cross section perpendicular to a cell extending direction. Moreover, the initial pressure loss to the amount of the collected ash was measured by use of a plugged honeycomb structure B (a usual plugged honeycomb structure) in which quadrangular cells (inflow cells) and quadrangular cells (outflow cells) were alternately formed via partition walls in a cross section perpendicular to a cell extending direction. In each of the plugged honeycomb structures A and B, a length in the cell extending direction was 114.3 mm, and a diameter was 143.8 mm.

Figure 9:
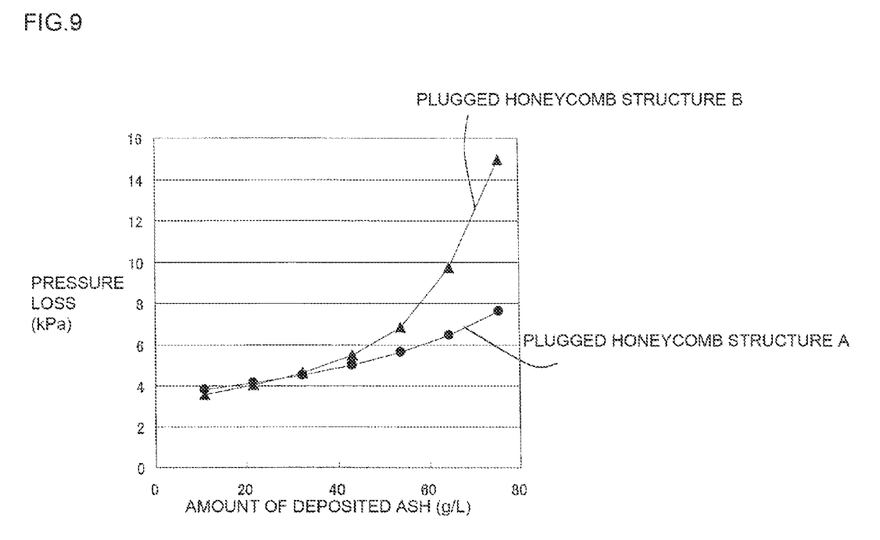
FIG. 9 is a graph showing the pressure loss (kPa) to an amount (g/L) of deposited ash.

Specifically, a flow rate of the exhaust gas which did not include the soot was 5 Nm³/minute, a temperature was 200° C., and this exhaust gas was supplied to each of the plugged honeycomb structures A and B. FIG. 9 shows the pressure loss (kPa) to an amount (g/L) of deposited ash in each of the plugged honeycomb structures A and B.

As apparent from FIG. 9, it is seen that the plugged honeycomb structure A has a lower pressure loss (kPa) to the amount (g/L) of deposited ash, and a larger ash collecting capacity as compared with the plugged honeycomb structure B. Therefore, it is seen that in the plugged honeycomb structure of the present invention including the honeycomb structure section constituted of the large and small cells having different open areas, it is possible to collect ash and particulate matter (PM) in large amounts, as compared with the usual plugged honeycomb structure.

TABLE 2

|  |  | Comparative Example 1 | Comparative Example 2 | Example 1 | Comparative Example 3 | Comparative Example 4 | Example 2 |
|---|---|---|---|---|---|---|---|
|  |  | Pressure loss (kPa) | | | | | |
| Flow rate of exhaust gas (Nm³/min.) | 1 | 0.10 | 0.07 | 0.08 | 0.18 | 0.16 | 0.17 |
|  | 2 | 0.25 | 0.16 | 0.18 | 0.42 | 0.35 | 0.37 |
|  | 3 | 0.46 | 0.27 | 0.32 | 0.72 | 0.58 | 0.62 |
|  | 4 | 0.71 | 0.41 | 0.49 | 1.08 | 0.85 | 0.91 |
|  | 5 | 1.02 | 0.57 | 0.68 | 1.51 | 1.16 | 1.25 |
|  | 6 | 1.39 | 0.77 | 0.93 | 2.00 | 1.52 | 1.64 |
|  | 7 | 1.82 | 1.01 | 1.21 | 2.57 | 1.93 | 2.09 |
|  | 8 | 2.30 | 1.28 | 1.53 | 3.20 | 2.39 | 2.59 |
|  | 9 | 2.83 | 1.57 | 1.89 | 3.91 | 2.90 | 3.15 |
|  | 10 | 3.42 | 1.90 | 2.28 | 4.69 | 3.46 | 3.77 |
| Evaluation of pressure loss | Ratio (%) | — | — | −33 | — | — | −20 |
|  | Evaluation result | — | — | A | — | — | A |

TABLE 3

|  |  | Comparative Example 1 | Comparative Example 2 | Example 1 | Comparative Example 3 | Comparative Example 4 | Example 2 |
|---|---|---|---|---|---|---|---|
|  |  | Pressure loss (kPa) | | | | | |
| Amount of deposited soot (g/L) | 0 | 0.34 | 0.24 | 0.27 | 0.62 | 0.54 | 0.56 |
|  | 0.1 | 0.60 | 0.42 | 0.47 | 1.02 | 0.91 | 0.94 |
|  | 0.2 | 0.79 | 0.60 | 0.65 | 1.36 | 1.26 | 1.29 |
|  | 0.3 | 0.90 | 0.73 | 0.77 | 1.60 | 1.52 | 1.54 |
|  | 0.4 | 0.96 | 0.82 | 0.86 | 1.75 | 1.70 | 1.71 |
|  | 0.6 | 1.08 | 1.00 | 1.02 | 2.01 | 2.02 | 2.02 |
|  | 0.8 | 1.20 | 1.14 | 1.16 | 2.12 | 2.16 | 2.15 |
|  | 1 | 1.32 | 1.28 | 1.29 | 2.24 | 2.31 | 2.29 |
|  | 2 | 1.88 | 1.96 | 1.94 | 2.80 | 3.02 | 2.97 |
|  | 3 | 2.39 | 2.61 | 2.56 | 3.32 | 3.72 | 3.62 |
|  | 4 | 2.87 | 3.24 | 3.15 | 3.83 | 4.42 | 4.27 |
| Increase ratio of pressure loss (%) |  | — | — | −18 | — | — | −6 |
| Evaluation of pressure loss |  | — | — | A | — | — | A |

Example 2

The procedures of Example 1 were repeated except that conditions shown in Table 1 were satisfied, to prepare a plugged honeycomb structure.

In the plugged honeycomb structure of the present example, a partition wall thickness in a central portion of a honeycomb structure section was 0.30 mm. Moreover, in the central portion of the honeycomb structure section of the plugged honeycomb structure, an inflow cell open area was 0.880 mm², and an outflow cell open area was 0.492 mm². In the central portion of the honeycomb structure section of the plugged honeycomb structure, a cell density was 47 cells/cm².

In an outer peripheral portion of the honeycomb structure section of the plugged honeycomb structure, a partition wall thickness was 0.30 mm. Moreover, in the outer peripheral portion of the honeycomb structure section of the plugged honeycomb structure, an inflow cell open area was from 0.675 mm² (an outer peripheral side of the honeycomb structure section) to 0.820 mm² (the center side of the honeycomb structure section). Furthermore, an outflow cell open area was from 0.543 mm² (the center side of the honeycomb structure section) to 0.675 mm² (the outer peripheral side of the honeycomb structure section). Additionally, the above inflow cell open area decreased, from the center side toward the outer periphery of the honeycomb structure section. Moreover, the above outflow cell open area increased, from the center side toward the outer periphery of the honeycomb structure section. In the outer peripheral portion of the honeycomb structure section of the plugged honeycomb structure, a cell density was 47 cells/cm². In the honeycomb structure section of the plugged honeycomb structure of the present example, a difference in open area between the outflow cell and the inflow cell decreased, from the center side toward the outer periphery of the honeycomb structure section in the outer peripheral portion of the honeycomb structure section.

In the plugged honeycomb structure, a length in the cell extending direction was 152.4 mm, and a diameter was 143.8 mm. A porosity of each partition wall of the plugged honeycomb structure was 48%. An average pore diameter of the partition walls was 12 μm. The measurement results are shown in Table 1.

As to this plugged honeycomb structure, the above [measurement of a pressure loss (kPa)] was performed. The results are shown in Tables 2 and 3.

Comparative Example 1

Conditions shown in Table 1 were satisfied, and "a difference in open area between an outflow cell and an inflow cell in an outer peripheral portion of a honeycomb structure section was the same as a difference in open area between an outflow cell and an inflow cell in a central portion of the honeycomb structure section". Specifically, the difference in open area between the outflow cell and the inflow cell in the honeycomb structure section was the same. Moreover, the procedures of Example 1 were repeated except for these conditions, to prepare a plugged honeycomb structure. As to this plugged honeycomb structure, the above [measurement of a pressure loss (kPa)] was performed. The results are shown in Tables 2 and 3 and FIG. 6 to FIG. 8.

Comparative Example 2

The procedures of Example 1 were repeated except that conditions shown in Table 1 were satisfied and that "a shape of a plurality of cells (outflow cells and inflow cells) was a quadrangular shape and all open areas were the same", to prepare a plugged honeycomb structure. As to this plugged honeycomb structure, the above [measurement of a pressure loss (kPa)] was performed. The results are shown in Tables 2 and 3 and FIG. 6 to FIG. 8.

Comparative Examples 3 and 4

The procedures of Example 1 were repeated except that conditions shown in Table 1 were satisfied, to prepare plugged honeycomb structures. As to the plugged honeycomb structures, the above [measurement of a pressure loss (kPa)] was performed. The results are shown in Tables 2 and 3.

Figure 6:
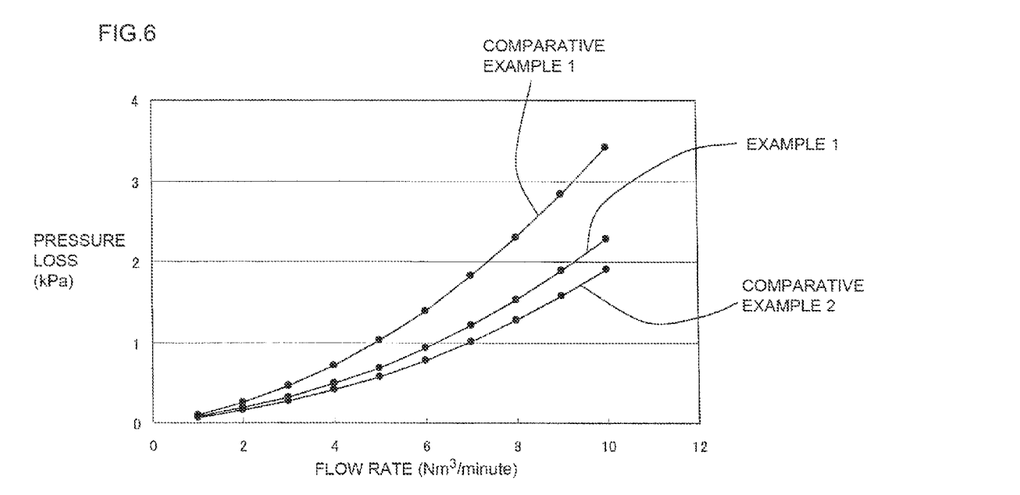
FIG. 6 is a graph showing a relation between a flow rate (Nm$^3$/minute) of an exhaust gas and a pressure loss (kPa)
Figure 7:
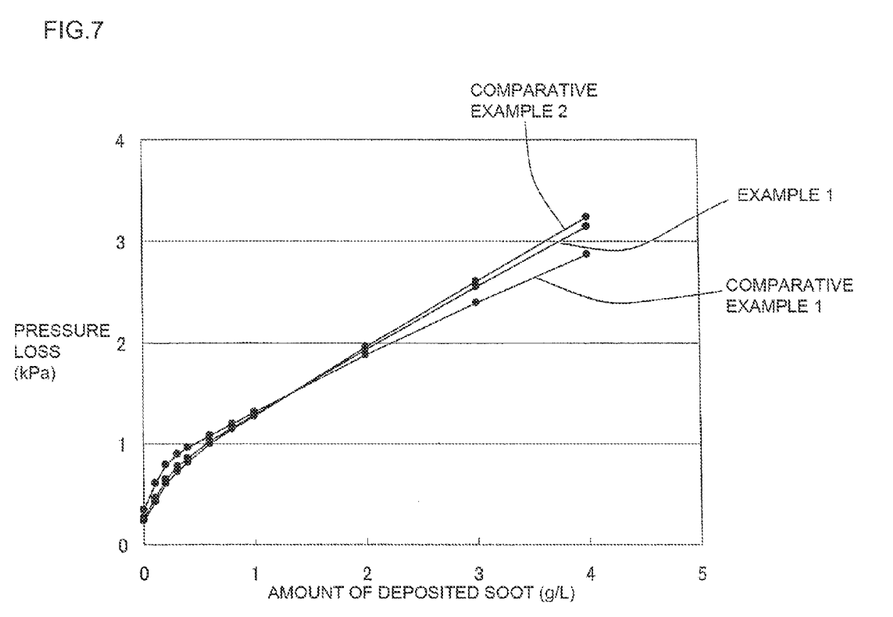
FIG. 7 is a graph showing a relation between an amount (g/L) of deposited soot and the pressure loss (kPa)
Figure 8:
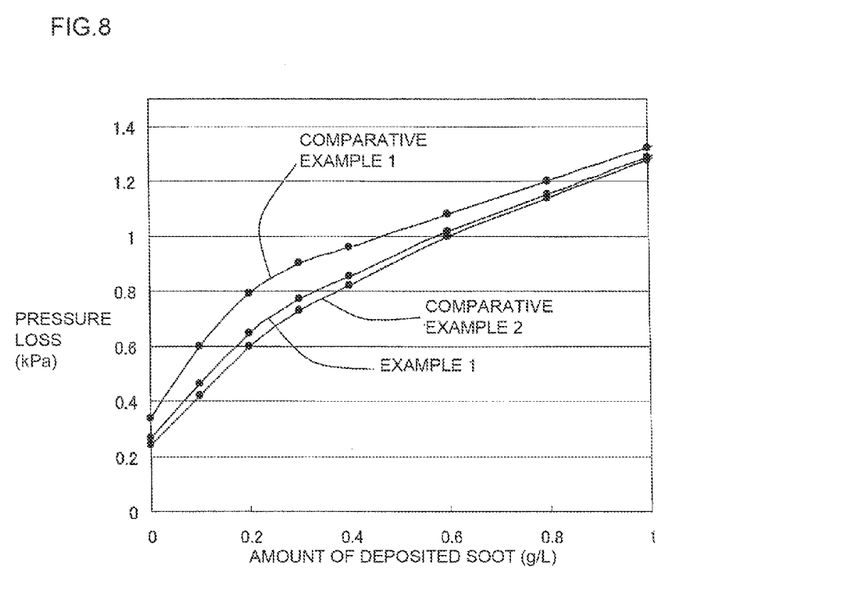
FIG. 8 is a graph showing an enlarged part of the graph shown in FIG. 7.

As apparent from Table 2, Table 3 and FIG. 6 to FIG. 8, it has been found that in the plugged honeycomb structures of Examples 1 and 2, an increase of the pressure loss at supply of a gas which does not include ash or soot is suppressed as compared with the plugged honeycomb structures of Comparative Examples 1 to 4. That is, it has been seen that the plugged honeycomb structures of Examples 1 and 2 are excellent purifying filters of an exhaust gas containing a less amount of ash and PM such as the soot. Moreover, it has been seen that when the exhaust gas including the ash and soot is supplied, an increase of an initial pressure loss is especially suppressed (see FIG. 8). Furthermore, as apparent from Table 1, the plugged honeycomb structures of Examples 1 and 2 are provided with the cells having large and small open areas, and hence it is possible to collect the ash and PM in large amounts, as compared with the plugged honeycomb structures of Comparative Examples 1 to 4.

A plugged honeycomb structure of the present invention can suitably be used for purification of an exhaust gas including ash and particulate matter.

DESCRIPTION OF SIGNS

4: cell, 4a: inflow cell, 4b: outflow cell, 5: partition wall, 7: outer peripheral wall, 8a: inflow side plugged portion, 11: honeycomb structure section, 11a: inflow side end surface, 11b: outflow side end surface, 21: outer peripheral honeycomb segment, 22: central honeycomb segment, 24: joining material, f: bold line, P: partial region, and 100, 101, 102 and 103: plugged honeycomb structure.

What is claimed is:

1. A plugged honeycomb structure comprising:
    a honeycomb structure section having porous partition walls with which a plurality of cells extending from an inflow side end surface to an outflow side end surface are formed to become through channels of a fluid, the plurality of cells including cells having different open areas in a cross section perpendicular to an extending direction of the cells;
    inflow side plugged portions arranged in inflow side end portions of the predetermined cells; and
    outflow side plugged portions arranged in outflow side end portions of the remaining cells,
    wherein in the honeycomb structure section, outflow cells which are the cells provided with the inflow side plugged portions and inflow cells which are the cells provided with the outflow side plugged portions are alternately formed via the partition walls,
    the open area of each of the inflow cells in a central portion of the honeycomb structure section is larger than the open area of each of the outflow cells in the central portion of the honeycomb structure section, a difference in the open area between the outflow cell and the inflow cell in an outer peripheral portion of the honeycomb structure section is smaller than a difference in the open area between the outflow cell and the inflow cell in the central portion of the honeycomb structure section, a shape of the inflow cells in the central portion and the shape of the inflow cells in the outer peripheral portion are different in the cross section perpendicular to the extending direction of the inflow and outflow cells, and a thickness of the partition walls is uniform for each of the plurality of cells in the honeycomb structure section.

2. The plugged honeycomb structure according to claim 1, wherein in the honeycomb structure section, the difference in the open area between the outflow cell and the inflow cell decreases, from a center side toward an outer periphery of the honeycomb structure section in the outer peripheral portion of the honeycomb structure section.

3. The plugged honeycomb structure according to claim 1, wherein the honeycomb structure section is constituted of outer peripheral honeycomb segments constituting an outer periphery of the honeycomb structure section, and central honeycomb segments positioned on inner sides of the outer peripheral honeycomb segments, in the central honeycomb segments, the open area of the inflow cell is larger than the open area of the outflow cell, and in the outer peripheral honeycomb segments, the open area of the outflow cell is the same as that of the inflow cell.

4. A plugged honeycomb structure comprising:

a honeycomb structure section having porous partition walls with which a plurality of cells extending from an inflow side end surface to an outflow side end surface are formed to become through channels of a fluid, the plurality of cells including cells having different open areas in a cross section perpendicular to an extending direction of the cells;

inflow side plugged portions arranged in inflow side end portions of the predetermined cells; and outflow side plugged portions arranged in outflow side end portions of the remaining cells, wherein in the honeycomb structure section, outflow cells which are the cells provided with the inflow side plugged portions and inflow cells which are the cells provided with the outflow side plugged portions are alternately formed via the partition walls, the open area of each of the inflow cells in a central portion of the honeycomb structure section is larger than the open area of each of the outflow cells in the central portion of the honeycomb structure section, a difference in the open area between the outflow cell and the inflow cell in an outer peripheral portion of the honeycomb structure section is smaller than a difference in the open area between the outflow cell and the inflow cell in the central portion of the honeycomb structure section, a shape of the inflow cells in the central portion and the shape of the inflow cells in the outer peripheral portion are different in the cross section perpendicular to the extending direction of the inflow and outflow cells, and the open areas of adjacent inflow cells in the outer periphery portion of the honeycomb structure section decrease closer to the outer periphery, and the open areas of adjacent outflow cells in the outer periphery portion of the honeycomb structure section increase closer to the outer periphery.

5. The plugged honeycomb structure according to claim 1, wherein the open area of the inflow cell is not smaller than the open area of the outflow cell in the outer peripheral portion.

6. The plugged honeycomb structure according to claim 1, wherein the open area of each inflow cell is not smaller than the open area of each outflow cell in the central portion.

7. The plugged honeycomb structure according to claim 1, wherein the open area of each inflow cell is from 1.2 to 5.5 times the open area of each outflow cell in the central portion.

8. The plugged honeycomb structure according to claim 1, wherein the open area of the inflow cells decreases from the center toward the outer periphery of the honeycomb structure section.

9. The plugged honeycomb structure according to claim 1, wherein the open area of the outflow cells increases from the center toward the outer periphery of the honeycomb structure section.

10. The plugged honeycomb structure according to claim 1, wherein the shapes of the inflow cells and the outflow cells respectively includes one of a triangular shape, a quadrangular shape, a hexagonal shape and an octagonal shape.

11. The plugged honeycomb structure according to claim 1, wherein the shape of the inflow cells is an octagonal shape and the shape of the outflow cells in a quadrangular shape in the central portion.

12. The plugged honeycomb structure according to claim 1, wherein a length of a portion of each of four sides of each inflow cell, which are adjacent to outflow cells via the partition walls, is the same as the width of the outflow cells in the central portion.

13. The plugged honeycomb structure according to claim 1, wherein a thickness of the partition walls is from 64 to 508 μm.

14. The plugged honeycomb structure according to claim 1, wherein a porosity of the partition walls is from 37 to 70%.

15. The plugged honeycomb structure according to claim 1, wherein an average pore diameter of the partition walls is from 7 to 30 μm.

16. The plugged honeycomb structure according to claim 1, wherein a cell density of the honeycomb structure section is from 15 to 62 cells/cm$^2$.

* * * * *